United States Patent

Huggins

Patent Number: 5,250,648
Date of Patent: Oct. 5, 1993

[54] PREPARATION OF ORGANIC SILIZANE POLYMERS AND CERAMIC MATERIALS THEREFROM

[75] Inventor: John Huggins, Leverkusen, Fed. Rep. of Germany

[73] Assignee: Bayer Aktiengesellschaft, Leverkusen, Fed. Rep. of Germany

[21] Appl. No.: 875,497

[22] Filed: Apr. 29, 1992

[30] Foreign Application Priority Data

May 1, 1991 [DE] Fed. Rep. of Germany ....... 4114217

[51] Int. Cl.$^5$ .............................................. C08G 77/06
[52] U.S. Cl. ...................................... 528/21; 528/31; 528/35; 556/412
[58] Field of Search .................... 528/31, 35, 21; 556/412

[56] References Cited

U.S. PATENT DOCUMENTS

| | | | |
|---|---|---|---|
| 4,482,669 | 11/1984 | Seyferth et al. | 524/442 |
| 4,720,532 | 1/1988 | Seyferth et al. | 528/28 |
| 4,869,854 | 9/1989 | Takeda et al. | 528/31 |

FOREIGN PATENT DOCUMENTS

| | | |
|---|---|---|
| 0296433 | 12/1988 | European Pat. Off. |
| 0296434 | 12/1988 | European Pat. Off. |
| 0368536 | 10/1989 | European Pat. Off. |

Primary Examiner—Melvyn I. Marquis
Attorney, Agent, or Firm—Sprung Horn Kramer & Woods

[57] ABSTRACT

A process for the preparation of a ceramic material comprising
a) reacting at least one organochlorosilane of the formula

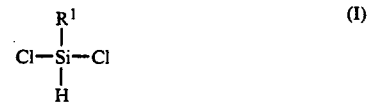

in which
$R^1$ is Cl, H, $C_1$- to $C_4$-alkyl or phenyl, optionally together with at least one organochlorosilane of the formula

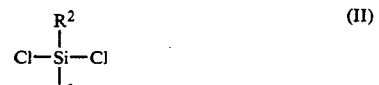

or

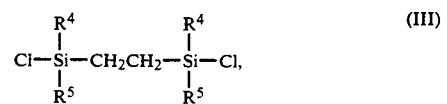

in which
$R^2$, $R^3$, $R^4$ and $R^5$ each, independently is Cl, $C_1$- to $C_4$-alkyl, vinyl or phenyl, with ammonia in an inert solvent at a temperature from about $-80°$ C. to $120°$ C. to form a product of ammonolysis,
b) polymerizing the product of ammonolysis in the presence of a basic catalyst of the formula $$R^6R^7R^8R^9N^+A^- \quad (IV)$$

in which
$R^6$, $R^7$, $R^8$ and $R^9$ each independently is an organic group having 1 to 24 carbon atoms, and
$A^-$ is a basic anion capable of causing deprotonation, to form an organic silazane polymer,
c) sintering the silazane polymer. The silazane polymer and the ceramic are new.

7 Claims, No Drawings

PREPARATION OF ORGANIC SILAZANE POLYMERS AND CERAMIC MATERIALS THEREFROM

This invention relates to new organic silazane polymers, to a process for their preparation and to a process for the production of ceramic materials from these silazane polymers.

There has been great interest in recent times in processes for the production of ceramic materials containing silicon nitride/silicon carbide. Silicon nitride and silicon carbide have numerous desirable properties, such as chemical inertness, extreme hardness and stability at very high temperatures.

The pyrolysis of organic silazane polymers to form ceramic materials containing silicon nitride/silicon carbide has already been described in the literature (K. J. Wynne and R. W. Rice *Ann. Rev. Mater. Sci.* Vol. 14 (1984), 297–334; D. Seyferth in "Transformation or Organometallics into Common and Exotic Materials: Design and Activation", R. M. Laine, Ed., Martinus Nijhoff Publ., 1988, pages 133–154).

Polymer precursors for ceramic materials containing silicon nitride/silicon carbide are used inter alia in the production of ceramic coatings and fibers and as binders or matrix materials for the production of molded articles from ceramic or metal powders of ceramic fibers.

Organochlorosilanes are generally used as starting materials for the preparation of organosilazanes and reacted with ammonia or primary or secondary amines. These products of ammonolysis are suitable only to a limited extent as precursors for ceramic materials as they provide only low ceramic yields from pyrolysis at temperatures from 800° to 2000° C. Numerous proposals have therefore been made for processes for the preparation of organic silazane polymers which are characterized by higher ceramic yields from pyrolysis, as may be seen in particular from the literature references described below.

DE-A 2 218 960 discloses a process for the production of $SiC/Si_3N_4$ ceramic materials, which consists in reacting chlorosilanes with amines or ammonia and subsequently heating to high temperatures. Carbosilazane resins are formed in the process, but their formation requires high temperatures of from 520° to 650° C. so that this process is not very attractive for the industrial production of silazane polymers. Further, carbosilazane resins have the disadvantage that the yield of ceramic materials obtained from them is only about 55% by weight. In the examples of practical application given in this reference, the only chlorosilazanes used are methyl trichlorosilane and dimethyldichlorosilane and the only amine used is methylamine.

U.S. Pat. No. 4,482,669 describes a process for the preparation of organic silazane polymers in which ammonia is reacted with organochlorosilanes corresponding to the general formula (1)

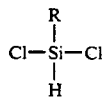

(1)

to form a product of ammonolysis. This ammonolysis product is then polymerized with the aid of basic catalysts to form silazane polymers.

The catalysts described are alkali metal and alkaline earth metal hydrides, e.g. KH and NaH, alkali metal and alkaline earth metal complex hydrides, e.g. $KB(sec-C_4H_9)_3H$, $LiB(C_2H_5)_3H$ and $LiAl(OC_4H_9)_3H$, alkali metal and alkaline earth metal hydroxides, alkoxides, amides and silyl amides, e.g. lithium, sodium or potassium alkoxides or $[(CH_3)_3Si]_2NM$ (M=alkali metal or a half equivalent alkaline earth metal) or alkali metals, alone or combined with polycyclic aromatic hydrocarbons. According to the examples given in this patent, the catalysts used are preferably potassium hydride, sodium amide and potassium tri-(sec-butyl)boron hydride. The catalyst is subsequently neutralized with methyl iodide and the precipitated alkali metal iodide is separated off. When the silazane polymers obtained from this process are pyrolyzed at temperatures of up to 1000° C. they give rise to ceramic materials in high yields.

Several other processes for the preparation of organic silazane polymers by basic catalyzed polymerization of the ammonolysis products of organochlorosilanes are described in U.S. Pat. No. 4,720,532, DE-A 37 19 343, DE-A 37 36 914, EP-A 0 296 433 and EP-A 0 296 434. These processes differ only in the choice of organochlorosilanes used for ammonolysis but a minimum proportion of chlorosilanes corresponding to the general formula (1) is used in all cases.

Basic catalysts containing alkali metals, preferably potassium hydride, are used for the polymerization in all these processes. After polymerization, the catalyst is neutralized with a halogen-containing electrophilic compound such as methyl iodide or an organochlorosilane and the precipitated potassium halide is removed.

The last described processes have, however, several disadvantages:

The preferred catalysts, i.e. potassium hydride, sodium amide and potassium tri-(sec-butyl)boron hydride, are readily inflammable solids or form readily inflammable or spontaneously inflammable solutions which develop inflammable gases in the presence of atmospheric moisture. Handling large quantities of these substances therefore entails a risk of fire and explosion. Elaborate measures for avoiding these risks must therefore be employed when carrying out this process on an industrial scale.

Further, all the basic catalysts hitherto described contain alkali metal or alkaline earth metal cations as counter ions. To remove the cations, the catalysts are neutralized with halogen containing electrophils and the resulting precipitates of alkali metal halide or alkaline earth metal halide salts are removed by filtration. These steps of neutralization and filtration are not only time consuming but also relatively ineffective. Residues of alkali metal halide or alkaline earth metal halide salts are invariably left in the product as impurities. Such impurities are undesirable and are liable to have a deleterious influence on the properties of a ceramic material produced from such polymers.

It is an object of the present invention to provide silazane polymers which are characterised by excellent properties for the production of ceramic materials, such as good solubility, fusibility and moldability and high ceramic yields.

A process has been found which enables suitable silazane polymers to be produced. The present invention thus relates to a process for the preparation of organic silazane polymers, characterized in that a) at least one organochlorosilane corresponding to formula (I)

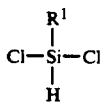

$$\begin{array}{c} R^1 \\ | \\ Cl-Si-Cl \\ | \\ H \end{array} \quad (I)$$

wherein
R$^1$=Cl, H, C$_1$ to C$_4$-alkyl or phenyl, is reacted, either alone or together with one or more organochlorosilanes corresponding to formula (II) or (III)

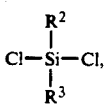

$$\begin{array}{c} R^2 \\ | \\ Cl-Si-Cl, \\ | \\ R^3 \end{array} \quad (II)$$

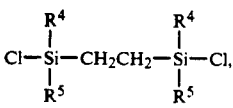

$$\begin{array}{c} R^4 \quad\quad R^4 \\ | \quad\quad\quad | \\ Cl-Si-CH_2CH_2-Si-Cl, \\ | \quad\quad\quad | \\ R^5 \quad\quad R^5 \end{array} \quad (III)$$

wherein
R$^2$, R$^3$, R$^4$ and R$^5$ denote, independently of one another, Cl, C$_1$- to C$_4$-alkyl, vinyl or phenyl, with ammonia in an inert solvent at temperatures of from −80° C. to 120° C. to form a product of ammonolysis, and b) the product of ammonolysis is polymerized in the presence of a basic catalyst corresponding to formula IV

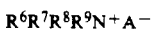

$$R^6R^7R^8R^9N^+A^- \quad (IV)$$

wherein
R$^6$, R$^7$, R$^8$ and R$^9$ denote, independently of one another, organic groups having 1 to 24 carbon atoms and A$^-$ stands for a basic anion capable of causing deprotonation, to form an organic silazane polymer.

As already mentioned, the use of chlorosilanes as starting material for the preparation of silazane polymers and the base catalyzed polymerization of the corresponding products of ammonolysis are already known. It has not hitherto been described or suggested, however, that catalysts corresponding to the general formula (IV) could be used for the base catalyzed polymerization and that this provides a simple means of obtaining organic silazane polymers with excellent properties.

The organochlorosilane mixture used in the process according to the invention consists of a combination of one or more silanes corresponding to formulae (I), (II) and (III). At least 5 mol-% of one or more organochlorosilanes of formula (I) are used in the process according to the invention.

The following are examples of organochlorosilanes of formula (I) suitable for the process: Methyldichlorosilane, phenyldichlorosilane, dimethylchlorosilane, phenylmethylchlorosilane, trichlorosilane and dichlorosilane.

The following are examples of organochlorosilanes corresponding to formula (II) suitable for the process: Dimethyldichlorosilane, methyltrichlorosilane, methylvinyldichlorosilane, vinyltrichlorosilane, diphenyldichlorosilane, methylphenyldichlorosilane, phenyltrichlorosilane, diethyldichlorosilane, methylethyldichlorosilane, dipropyldichlorosilane, methylpropyldichlorosilane, ethyltrichlorosilane, propyltrichlorosilane, isobutyltrichlorosilane and tetrachlorosilane.

The following are examples of organochlorosilanes corresponding to formula (III) suitable for the process: 1,2,-Bis-(dimethylchlorosilyl)ethane, 1,2-bis-(methyldichlorsilyl)ethane and 1,2,-bis-(trichlorosilyl)ethane.

In a preferred embodiment of the process according to the invention, R$^1$ and R$^2$=methyl, R$^3$=Cl, methyl or vinyl and R$^4$ and R$^5$=Cl or methyl.

In a preferred embodiment of the process according to the invention, from 0–95 mol-% of one or more of the following organochlorosilanes: methyltrichlorosilane, dimethyldichlorosilane, methylvinyldichlorosilane, 1,2-bis-(dimethylchlorosilyl)ethane and 1,2-bis-(methyldichlorosilyl)ethane, are mixed with 5 to 100 mol-% of methyl dichlorosilane and reacted with ammonia.

It is particularly preferred to react a mixture of from 0–70 mol-% of methyltrichlorosilane, from 0–50 mol-% of dimethyldichlorosilane, methylvinyldichlorosilane, 1,2-bis-(dimethylchlorosilyl)-ethane or 1,2-bis-(methyldichlorosilyl)-ethane or mixtures thereof and from 5–100 mol-% of methyldichlorosilane with ammonia.

The organochlorosilane mixture used in the process according to the invention is reacted with ammonia to form the ammonolysis product. The measures for forming the ammonolysis product are not critical and are described in detail in U.S. Pat. No. 4,482,669 (columns 7, 8 and 9). For example, the organochlorosilane mixture may be reacted with gaseous ammonia in an organic solvent and the organic solvent may be distilled off after removal by filtration of the ammonium chloride formed as by-product. It is preferred to use solvents in which the ammonium chloride is only sparingly soluble and from which it can easily be separated, e.g. ethers and aliphatic, aromatic and chlorinated hydrocarbons. The ammonolysis is carried out with an excess of ammonia to ensure that the reaction will be complete and the end products as far as possible free from chlorine. A temperature from about −80° to 120° C. is generally employed, preferably from −40° to 40° C.

Ammonia is preferably used in the process according to the invention in a quantity of at least 1.5 moles per mole of silicon-bound chlorine atoms of the organochlorosilane mixture.

In a further step, the product of ammonolysis is then polymerized in the presence of a basic catalyst of formula (IV) capable of causing deprotonation, to form an organic silazane polymer.

The basic catalyst according to the invention is preferably a tetraalkylammonium hydroxide and/or tetraalkylammonium alkoxide. The following are particularly preferred: Complexes of tetramethylammonium, tetraethylammonium, tetrapropylammonium, tetrabutylammonium, benzyl trimethylammonium, benzyltriethylammonium, benzyl tributylammonium, trimethyl-(2-hydroxyethyl)-ammonium, dodecyltrimethylammonium, dodecyldimethyl-(2-hydroxyethyl)-ammonium and of methyltrioctylammonium with hydroxy and alkoxy anions such as methoxy, ethoxy or the like. It is also advantageous to use other basic complexes of these cations e.g. tetraalkylammonium-complexes of metal hydrides such as boron hydride, tri-sec.-butyl-boron hydride, triethylboron hydride, tert.-butyl-diisobutylaluminum hydride and the like.

The non-basic tetraalkylammonium halides corresponding to the formula R$_4$N$^+$X$^-$ (X=Cl, Br, I) are not effective and are not claimed for this process. Catalysts such as tetraethylammonium methoxide, tetrabutylammonium methoxide and benzyltrimethylammonium methoxide are preferably used because of their availability and good solubility.

The catalyst may be used in quantities of from 0.01 to 10% by weight and is preferably used in quantities of from 0.1 to 3% by weight. It may be introduced into the reaction mixture by various means. It may be used pure or as a solution in protic or aprotic organic solvents. Solutions in aprotic organic solvents are preferably used. Many of these catalysts are available as solutions in protic solvents such as methanol and the like. A solution in an aprotic organic solvent such as pyridine, dimethyl sulfoxide, N,N-dimethylformamide or the like may easily be prepared by the method of Y. Sprinzak (J. Am. Chem. Soc., Volume 80 (1958), 5449–5455).

The present invention also relates to an organic silazane polymer characterized in that it is obtainable by a) the reaction of at least one organic chlorosilane corresponding to formula (I)

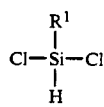

(I)

wherein $R^1$ = Cl, H, $C_1$ to $C_4$-alkyl or phenyl, alone or together with one or more organochlorosilanes corresponding to formula (II) or (III)

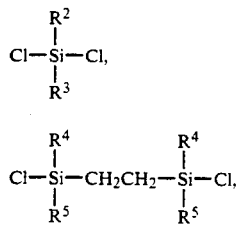

wherein $R^2$, $R^3$, $R^4$ and $R^5$ denote, independently of one another, Cl, $C_1$- to $C_4$-alkyl, vinyl or phenyl, with ammonia in an inert solvent at temperatures of from −80° C. to 120° C. to form a product of ammonolysis and b) polymerization of the product of ammonolysis in the presence of a basic catalyst corresponding to formula IV $$R^6R^7R^8R^9N^+A^-  \quad (IV),$$

wherein

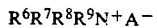, $R^7$, $R^8$ and $R^9$ denote, independently of one another, organic groups having 1 to 24 carbon atoms and $A^-$ stands for a basic anion which is capable of effecting a deprotonation, to form an organic silazane polymer.

The polymerization is preferably carried out in a solvent. The solvents used may be ethers such as tetrahydrofuran (THF), dialkylethers and the like, aliphatic hydrocarbons such as pentane, hexane and the like, aromatic hydrocarbons such as benzene, toluene, xylene and the like and polar aprotic organic solvents such as dimethyl sulfoxide (DMSO), N,N-dimethylformamide (DMF) and the like.

Polymerization is carried out at temperatures of from 0° to 200° C. depending on the catalyst, preferably at temperatures from 20° C. to the boiling point of the solvent, in particular at 20° to 80° C.

Polymerization proceeds by the reaction of Si—H with N—H groups to form new Si—N bonds and $H_2$. The progress of the reaction can be detected by the evolution of gas and demonstrated by the $^1H$ NMR spectrum of the silazane polymer. The integral ratio of SiH to $SiCH_3$ decreases as the reaction progresses. The end of polymerization is indicated by termination of the evolution of gas.

In contrast to the processes hitherto known for the base catalysed polymerization of ammonolysis products, the catalysts according to the invention need not be neutralized after polymerization. After termination of the reaction, the product is easily obtained by evaporation of the solvent and volatile constituents.

The catalysts according to the invention undergo one or more decomposition reactions at elevated temperatures and are thereby rendered inactive. These decomposition reactions vary according to the structure of the ammonium salt and occur at different temperatures. The decomposition products are generally amines and hydrocarbons. This provides an additional possibility for controlling the polymerization reaction.

In a preferred embodiment, the silazane polymers according to the invention are free from alkali metal and alkaline earth metals, a feature which renders them particularly suitable for further processing to high performance ceramics.

If these organic silazane polymers are to be used for the production of ceramic materials, many applications require the silazane polymers to have good solubility, moldability and processibility.

These properties can be varied within wide ranges by varying the reaction conditions of polymerization and the composition of the silane mixture. Polymerization of the product of ammonolysis of methyldichlorosilane, for example, generally results in an infusible, insoluble polymer. If, on the other hand, at least 5 mol-% of dialkyldichlorosilanes are used for ammonolysis, silazane polymers with good solubilities and low melting points are obtained after polymerization. By employing these measures, silazane polymers with excellent polymer properties can be produced easily and reproducibly by the process according to the invention.

For producing ceramic materials containing silicon nitride, the organic silazane polymers are introduced into the required mold, optionally rendered infusible and then sintered to form a ceramic material. For this purpose, the silazane polymer according to the invention preferably has a melting point in the region of from 50° to 200° C.

The present invention also relates to a process for the production of ceramic materials containing silicon nitride, consisting in that the silazane polymer is sintered to form a ceramic material.

In a preferred embodiment of this process, the silazane polymer is melted, molded and sintered to produce a ceramic material.

In a particularly preferred embodiment, the organic silazane polymer is applied to a surface to produce coatings or spun to produce fibers or mixed with ceramic or metal powders or ceramic fibers for the production of molded parts and then molded under the action of heat and/or pressure. After its application, spinning or molding, the silazane polymer may be rendered infusible by tempering, oxidation, hydrolysis or irradiation. The silazane polymer is then sintered at temperatures from 800° to 2000° C. to form a ceramic material. Sintering is carried out in a vacuum or in an inert gas atmosphere. A ceramic material formed SiC and $Si_3N_4$ is formed by these means. When sintering is carried out at least in part in an atmosphere of $H_2$ or $NH_3$ gas, a ceramic almost free from carbon is obtained.

The process according to the invention gives rise to organic silazane polymers of high quality. The silazane polymers are generally readily soluble in conventional organic solvents and are characterized by good fusibility and processability, properties which vary according to their composition. Sintering of the silazane polymers results in high ceramic yields, for example from 75 to 85% by weight.

The shaping process may be carried out in various ways depending on the form of the desired ceramic article. Coatings may be produced from solutions; fibers may be spun. For the production of moulded articles, the polymers may be mixed with ceramic or metal powders or ceramic fibers and then molded by injection molding, pressure molding or hot pressing with the application of pressure and/or heat.

The molded parts may subsequently be rendered infusible by heating in air or irradiation with an electron beam or irradiation with ultraviolet light or other processes.

After the organic silazane polymers according to the invention have been molded, they are sintered at temperatures of from 800° to 2000° C. to form ceramic materials. The sintering is preferably carried out in two stages. The silazane polymer is pyrolyzed at temperatures of from 800° to 1500° C. and converted into a ceramic material which is to a large extent amorphous. At temperatures of from 1500° to 2000° C., depending on the addition of sintering aids, the ceramic part is compacted. The ceramic yield is determined mainly by the process of pyrolysis at temperatures of up to 1500° C.

Sintering is carried out in a vacuum or in an inert gas atmosphere such as $N_2$, He, Ar or the like. A ceramic material composed of SiC and $Si_3N_4$ is thereby obtained. When sintering is carried out at least in part in an atmosphere of $H_2$ or $NH_3$, the ceramic material obtained is almost carbon-free and consists mainly of $Si_3N_4$.

Ceramic products of great purity can easily be obtained in the desired form and with excellent physical properties by these means.

The invention will now be described in more detail in the following examples which serve merely to explain the invention and should in no way limit the scope of protection of the invention.

EXAMPLES

1. Ammonolysis of methyldichlorosilane.

288 g (2.5 mol) of methyldichlorosilane and 2 liters of dried toluene were introduced into a 4-liter four-necked flask equipped with stirrer, thermometer, $NH_3$ gas inlet tube and dry ice cooler. The temperature was lowered to $-15°$ C. to $-20°$ C. by external cooling and 190 g (11.2 mol, 50% excess) of $NH_3$ were introduced for 4 hours. During this time, the reaction temperature rose to 20° to 15° C. but fell to $-20°$ C. as the solution became saturated. The cooling was removed and the solution was slowly warmed to room temperature to enable to excess $NH_3$ to evaporate. The precipitated ammonium chloride was separated by filtration and the filter cake was washed three times with 100 ml portions of toluene. The toluene was evaporated at a reduced pressure of 1 mbar and a temperature of up to 30° C. The product of ammonolysis was obtained in a quantity of 134 g as a slightly cloudy, colorless liquid having a viscosity of 50 mPa.s (25° C.).

$^1$H-NMR (300 MHz, $CDCl_3$, ppm): δ0.0–0.3 (br, $SiCH_3$, Int. 126), 0.5–1.1 (br, NH, Int. 33), 4.3–5.0 (mult, SiH, Int. 38). Analysis: Si: 50.5%.

Pyrolysis of this product in a nitrogen atmosphere at temperatures of up to 1400° C. reached by heating at the rate of 5° C./minute resulted in a 48% by weight yield of a ceramic material.

2. Ammonolysis of methyldichlorosilane: dimethyldichlorosilane in a ratio of 75:25 (mol-%).

335 g (2.9 mol) of methyldichlorosilane, 125 g (0.97 mol) of dimethyldichlorosilane and 2 liters of dried tetrahydrofuran (THF) were introduced into a four-necked flask described in Example 1. The temperature was lowered to $-15°$ C. to $-20°$ C. and 300 g (17.6 mol) of $NH_3$ were introduced for 7 hours. The cooling was removed and the solution was slowly warmed to room temperature. The precipitated ammonium chloride was separated by filtration and the filter cake was washed three times with 100 ml of THF. The THF was evaporated off at reduced pressure up to 40° C. and 1 mbar. The product of ammonolysis was obtained in a quantity of 172 g as a slightly cloudy, colorless liquid having a viscosity of 11 mPa.s (25° C.).

$^1$H-NMR (300 MHz, $CDCl_3$, ppm): δ0.0–0.3 (br, $SiCH_3$, Int. 119), 0.4–1.0 (br, NH, Int. 30), 4.25–5.0 (mult, SiH, Int. 23.1). Analysis: Si, 39.0%.

When this product was pyrolyzed in a nitrogen atmosphere at temperatures of up to 1400° C. and a heating rate of 5° C./minute, a ceramic material was obtained in a yield of 24% by weight.

3. Ammonolysis of methyldichlorosilane: methyltrichlorosilane: methylvinyldichlorosilane in a ratio of 45:45:10 (mol-%).

126 g (1.1 mol) of methyldichlorosilane, 163.5 g (1.1 mol) of methyltrichlorosilane, 30.9 g (0.219 mol) of methylvinyldichlorosilane and 2.5 liters of dried toluene were introduced into a four-necked flask described in Example 1. The temperature was lowered to $-15°$ C. to $-20°$ C. and 240 g (14.1 mol) of $NH_3$ were introduced over a period of 6 hours. The cooling was removed and the solution was slowly warmed to room temperature. The precipitated ammonium chloride was separated by filtration and the filter was washed three times with 100 ml portions of toluene. The toluene was evaporated off at reduced pressure up to 60° C. and 1 mbar. The product of ammonolysis was obtained in a quantity of 128 g as a slightly cloudy, colorless liquid having a viscosity of 5200 mPa.s (25° C.).

$^1$H-NMR (300 MHz, $CDCl_3$, ppm): δ0.0–0.4 (br, $SiCH_3$, Int. 122), 0.5–1.2 (br, NH, Int. 43), 4.35–4.9 (br, mult, SiH, Int. 16.5), 5.65–6.2 (mult, $SiCH=CH_2$, Int. 10).

4. Polymerization of (1) with 0.25% by weight of benzyltrimethylammonium methoxide.

10 g of the product of ammonolysis from Example 1 and 150 g of dried THF were introduced into a 500 ml two-necked flask equipped with magnetic stirrer and cooler and the reaction mixture was covered with $N_2$. A mixture of 0.2 g (0.25% by weight) of 12.2% solution of benzyltrimethylammonium methoxide in dimethyl sulfoxide and 5 g of THF was prepared and added within 10 minutes. Slight evolution of gas was observed. The solution was stirred at 25° C. for 30 minutes and heated at reflux for 3 hours. The THF was distilled off at 25° C. and 30 mbar and the product was freed from volatile constituents at temperatures of up to 120° C. and at 1 mbar. The silazane polymer was obtained in a quantity of 5.8 g as a pink, brittle solid melting at 75° C.

$^1$H-NMR (300 MHz, acetone-d$_6$, ppm): δ0.0–0.5 (br, SiCH$_3$, Int. 147.1), 1.0–2.4 (br, NH, Int. 23.3), 3.4–3.5 (br, SiOCH$_3$, Int. 1), 4.4–5.1 (br, SiH, Int. 31.6), IR (KBr, cm$^{-1}$): 3400 (br, m), 2960 (sh, m), 2900 (sh, w), 2120 (sh, s), 1400 (br, w), 1260 (sh, s), 1175 (br, s), 850–1020 (br, vs), 760 (br, s). Analysis: C: 22.9%; N: 25.1%; 0, 4.6%; Si, 44.0%.

When this polysilazane was pyrolyzed in a nitrogen atmosphere at temperatures of up to 1400° C. with a heating rate of 5° C./minute, a ceramic material containing silicon nitride was obtained in a yield of 77.7% by weight.

5. Polymerization of (1) with 1.0% by weight of benzyltrimethylammonium methoxide.

10 g of the product of ammonolysis from Example 1 and 40 g of dried THF were introduced into a 250 ml two-necked flasked equipped with magnetic stirrer and cooler and the reaction mixture was covered with N$_2$. A mixture of 0.82 g (1% by weight) of a 12.2% solution of benzyltrimethylammonium methoxide in dimethyl sulfoxide and 10 g of THF was added within 10 minutes. Slight evolution of gas was observed. The solution was stirred at 25° C. for 90 minutes and heated at reflux for 2 hours. The THF was distilled off at 25° C. and 30 mbar and the product was freed from volatile constituents at temperatures of up to 80° C. and at 1 mbar.

The silazane polymer was obtained in a quantity of 8.8 g as an insoluble, brittle solid without melting point.

When this silazane polymer was pyrolyzed in a nitrogen atmosphere at temperatures of up to 1400° C. with a heating rate of 5° C./minute, a ceramic material containing silicon nitride was obtained in a yield of 84.2% by weight.

6. Polymerization of (2) with 1.0% by weight of benzyltrimethylammonium methoxide.

20 g of the product of ammonolysis from Example 2 and 50 g of dried THF were introduced into a 100 ml two-necked flask equipped with magnetic stirrer and cooler and the reaction mixture was covered with N$_2$. A mixture of 1.6 g (1% by weight) of a 12.2% solution of benzyltrimethylammonium methoxide in dimethyl sulfoxide and 10 g THF was prepared and added within 10 minutes. Vigorous evolution of gas was observed. The solution was stirred at 25° C. for one hour and heated at reflux for 4 hours. The THF was distilled off at 25° C. and 30 mbar and the product was freed from volatile constituents at 1 mbar and temperatures of up to 120° C. The silazane polymer was obtained in a quantity of 16.1 g as a yellowish, brittle solid having a melting point of 72° C.

$^1$H-NMR (300 MHz, acetone-d$_6$, ppm): δ0.00–0.5 (br, SiCH$_3$, Int. 164), 1.0–2.0 (br, NH, Int. 29), 3.4–3.5 (br, SiOCH$_3$, Int. 3), 4.5–5.1 (br, SiH, Int. 13.3). IR (KBr, cm$^{-1}$): 3400 (br, m), 2960 (sh, m), 2900 (sh, w), 2120 (sh, m), 1400 (br, w), 1260 (sh, s), 1160 (br, s), 850–1000 (br, vs), 750 (br, m). Analysis: Si, 41.5%.

When this silazane polymer was pyrolyzed in a nitrogen atmosphere at temperatures of up to 1400° C. with a heating up rate of 5° C./minute, a ceramic material containing silicon nitride was obtained in a yield of 74.8% by weight.

7. Polymerisation of (3) with 1.0% by weight of benzyltrimethylammonium methoxide.

10 g of the product of ammonolysis from Example 3 and 40 g of dried THF were introduced into a 100 ml two-necked flask equipped with magnetic stirrer and cooler and the reaction mixture was covered with N$_2$. A mixture of 0.82 g (1% by weight) of a 12.2% solution of benzyltrimethylammonium methoxide in dimethyl sulfoxide and 10 g of THF was added within 10 minutes. Vigorous evolution of gas was observed. The solution was kept at 25° C. for 4 hours and heated at reflux for 7 hours. The THF was distilled off at 25° C. and 30 mbar and the product was freed from volatile constituents at temperatures of up to 200° C. and at 30 mbar. The silazane polymer was obtained in a quantity of 8.8 g as a white solid melting at 160° C.

$^1$H-NMR (300 MHz, CDCl$_3$, ppm): δ0.0–0.5 (br, SiCH$_3$, Int. 143), 0.5–1.3 (br, NH, Int. 33), 3.4–3.5 (Br, SiOCH$_3$, Int. 3), 4.5–5.0 (Br, SiH, Int. 10), 5.6–6.2 (br, SiCH=CH$_2$, Int. 12). IR (KBr, cm$^{-1}$): 3400 (br, m), 2960 (sh, m), 2120 (sh, m), 1590 (br, w), 1400 (sh, w), 1260 (sh, s), 1170 (br, s), 880–1000 (br, vs), 750 (br, s). Analysis: Si: 42.0%.

When this silazane polymer was pyrolyzed in a nitrogen atmosphere at temperatures of up to 1400° C. at a heating rate of 5° C./minute, a ceramic material containing silicon nitride was obtained in a yield of 80.2% by weight.

8. Polymerization of (1) with tetramethylammonium hydroxide.

0.1 g of Tetramethylammonium hydroxide and 40 g of THF were introduced into a 100 ml single-necked flask equipped with magnetic stirrer and cooler and the reaction mixture was covered with N$_2$. A solution of 10 g of the product of ammonolysis from Example 1 in 10 ml of THF was added. Slight evolution of gas was observed. The solution was stirred at 25° C. for 30 minutes and then heated at reflux for 7 hours. The THF was distilled off at 25° C. and 30 mbar and the product was freed from volatile constituents at temperatures of up to 120° C. and 1 mbar. The silazane polymer was obtained in a quantity of 8.1 g as an insoluble, yellowish solid.

When this silazane polymer was pyrolyzed in a nitrogen atmosphere at up to 1400° C. with a heating up rate of 5° C. per minute, a ceramic material containing silicon nitride was obtained in a yield of 83.8% by weight.

9. Polymerization of (1) with 1% by weight of dimethyldodecyl-(2-hydroxyethyl)ammonium hydroxide.

10 g of the product of ammonolysis from Example 1 and 45 g of dried THF were introduced into a 100 ml two-necked flask equipped with magnetic stirrer and cooler and the reaction mixture was covered with N$_2$. A mixture of 0.2 g (1% by weight) of a 50% solution of dimethyldodecyl-(2-hydroxyethyl) ammonium hydroxide in methanol and 5 g of THF was added within 10 minutes. Slight evolution of gas was observed. The solution was stirred at 25° C. for one hour and heated at reflux for 10 hours. The THF was distilled off at 25° C. and 30 mbar and the product was freed from volatile constituents at temperatures of up to 120° C. and 1 mbar. The silazane polymer was obtained as a pink, sticky wax in a quantity of 5.4 g.

$^1$H-NMR (300 MHz, acetone-d$_6$, ppm): δ0.00–0.5 (br, SiCH$_3$, Int. 166), 1.0–2.0 (br, NH, Int. 44), 3.4–3.5 (br, SiOCH$_3$, Int. 3), 4.4–5.0 (br, SiH, Int. 30). IR (KBr, cm$^{-1}$): 3400 (br, m), 2995 (sh, m), 2120 (sh, m), 1400 (br, w), 1260 (sh, s), 1170 (br, s), 880–1000 (br, vs), 760 (br, m).

When this silazane polymer was pyrolyzed in a nitrogen atmosphere at temperatures of up to 1400° C. with a heating up rate of 5° C./minute, a ceramic material containing silicon nitride was obtained in a yield of 85.7% by weight.

Ammonolysis of methyldichlorosilane and polymerization with tetrabutylammonium hydroxide 368 g (3.2 mol) of methyldichlorosilane and 2.5 liters of dried toluene were introduced into a 4 liter, four-necked flask equipped with stirrer, thermometer, $NH_3$ gas inlet tube and dry ice cooler. 245 g (17.5 mol, excess) of $NH_3$ were then introduced over a period of 4 hours. During this time, the reaction temperature rose to 30° C. but fell to below 20° C. as the solution became saturated. The cooling was removed to enable excess $NH_3$ to evaporate. The precipitated ammonium chloride was separated by filtration and the filtrate was washed three times with 100 ml portions of toluene.

The filtrate (2300 g) was introduced into a 3-liter four-necked flask equipped with stirrer, thermometer, dropping funnel and water cooler.

A mixture of 2.72 g (about 0.25% by weight) of a 25% solution of tetrabutylammonium hydroxide in methanol and 20 g of toluene was added dropwise over a period of 20 minutes. Vigorous evolution of gas was observed. The solution was stirred at 23° C. for 3 hours and heated at reflux for 3 hours. The product was freed from toluene and volatile constituents at temperatures of up to 60° C. and at 1 mbar. The silazane polymer was obtained in a quantity of 162 g as a white, brittle solid melting at 153° C.

$^1$H NMR (300 MHz, $CDCl_3$, ppm): $\delta$0.00–0.5 (br, $SiCH_3$, Int. 131.8), 0.7–1.5 (br, NH, Int. 22), 3.4–3.5 (br, $SiOCH_3$, Int. 1), 4.3–5.0 (br, SiH, Int. 27.7). Analysis: Si: 45.0%. The product also contains 80 ppm of chloride and less than 1 ppm of potassium and iodide. When this silazane polymer was pyrolyzed in a nitrogen atmosphere at temperatures of up to 1200° C. with a heating up rate of 0.5° C. per minute, a ceramic material containing silicon nitride was obtained in a yield of 83.2% by weight.

11. Comparison Example: Polymerization of (1) with 1.0% by weight of tetramethylammonium bromide.

0.1 g of tetramethylammonium bromide and 40 g of dried THF were introduced into a 100 ml two-necked flask equipped with magnetic stirrer and cooler and the reaction mixture was covered with $N_2$. 10 g of the product of ammonolysis from Example 1 in 10 g of THF were then added. No evolution of gas was observed. The solution was stirred at 25° C. for 60 minutes and then heated at reflux for 6 hours. The THF was distilled off at 25° C. and 30 mbar and the product was freed from volatile constituents at temperatures of up to 80° C. and 1 mbar. The silazane was obtained as a cloudy, mobile oil in a quantity of 6.5 g.

$^1$H-NMR (300 MHz, $CDCl_3$, ppm): $\delta$0.0–0.3 (br, $SiCH_3$, Int. 150), 0.5–1.2 (br, NH, Int. 35), 4.3–5.0 (mult, SiH, Int. 45). IR (KBr, $cm^{-1}$): 3380 (br, m), 2960 (sh, m), 2900 (sh, w), 2120 (sh, vs), 1400 (sh, w), 1260 (sh, s), 1170 (br, s), 700–1000 (br, vs). The $^1$H NMR integral ratio $SiH/SiCH_3=0.30$ showed that this product was not polymerized and hardly distinguishable from the starting material ($SiH/SiCH_3=0.30$).

12. Comparison example: Polymerization with potassium hydride.

5.71 g (2.7% by weight) of a 35% KH dispersion in mineral oil were introduced into a 2 liter three-necked flask equipped with stirrer, thermometer, dropping funnel and cooler and the dispersion was covered with $N_2$. It was washed twice with about 50 ml of dried hexane to remove the mineral oil. 800 ml of dried THF were then added. A solution of 74 g of the product of ammonolysis from Example 1 in 200 ml of THF was added dropwise over a period of 10 minutes with constant stirring. Evolution of gas was observed, and ended after 2.5 hours. 10.6 g of methyl iodide were added and the reaction mixture was stirred overnight. The THF was evaporated off at 25° C. and 30 mbar and the product was dissolved in 300 ml of hexane. The precipitated KI was separated by filtration and the product was freed from solvent and volatile constituents at 30° C. and 1 mbar. The product was obtained as a white solid without melting point in a quantity of 74 g.

$^1$H-NMR (300 MHz, $CDCl_3$, ppm): $\delta$0.0–0.5 (br, $SiCH_3$, Int. 102), 0.5–1.8 (br, NH, Int. 44), 2.5 (br, $NCH_3$, Int. 3) 4.5–5.0 (br, SiH, Int. 18). IR (KBr, $cm^{-1}$): 3400 (br, m), 2960 (sh, m), 2900 (sh, w), 2130 (sh, m), 1410 (br, w), 1260 (sh, s), 1150–1200 (br, s), 820–1030 (br, vs), 750 (br, m). Analysis: C: 22.3%; N: 21.1%; Si: 42.6%. The product in addition contains 90 ppm of potassium and 350 ppm of iodine.

When this silazane polymer was pyrolyzed in a nitrogen atmosphere at temperatures of up to 1400° C. with a heating rate of 5° C. per minute, a ceramic material containing silicon nitride was obtained in a yield of 71% by weight.

13. Comparison Example: Ammonolysis of methyldichlorosilane and dimethyldichlorosilane in a ratio of 67:33 (mol-%) and polymerization with KH a) Ammonolysis 414 g (3.6 mol) of methyldichlorosilane, 150 g (1.16 Mol) of dimethyldichlorosilane and 2.2 liters of dried THF were introduced into a 4-liter four-necked flask equipped with stirrer, thermometer, $NH_3$ gas inlet tube and dry ice cooler. The temperature was lowered to $-15°$ C. to $-20°$ C. by external cooling and 365 g (21.5 mol, 50% excess) of $NH_3$ were introduced over a period of 7 hours. The reaction temperature rose to 10°–15° C. but fell to below $-20°$ C. as the solution became saturated. The cooling was removed and the solution was slowly heated to room temperature to enable the excess $NH_3$ to evaporate. The precipitated ammonium chloride was separated by filtration and the filter cake was washed three times with 100 ml of THF.

b) Polymerization 11.5 g (about 2% by weight) of a 35% KH dispersion in mineral oil were introduced into a 3-liter three-necked flask equipped with stirrer, thermometer, dropping funnel and cooler. The dispersion was washed three times with about 50 ml of dried hexane to remove the mineral oil. The THF solution of the product of ammonolysis from (a) was then added within 15 minutes. Vigorous evolution of gas was observed. The evolution of gas ended after 5 hours. 15 g of methyl iodide were added and the reaction mixture was stirred overnight. The THF was evaporated off at 25° C. and 30 mbar and the product was dissolved in 1020 ml of hexane. The precipitated KI was separated by filtration and the product was freed from solvent and volatile constituents at 40° C. and 1 mbar. The product was obtained as a white solid with a melting point of 95° C. in a quantity of 198 g.

$^1$H-NMR (300 MHz, $CDCl_3$, ppm): $\delta$0.0–0.5 (br, $SiCH_3$, Int. 146), 0.5–1.8 (br, NH, Int. 23), 2.5 (br, $NCH_3$, Int. 1) 4.5–5.0 (br, SiH, Int. 14).

IR (KBr, cm$^{-1}$): 3400 (br, m), 2960 (sh, m), 2900 (sh, w), 2120 (sh, m), 1410 (br, w), 1260 (sh, s), 1160 (br, s), 870-1020 (br, vs), 790 (br, w). Analysis: Si: 44.2%. The product in addition contained 20 ppm of potassium and 30 ppm of iodine.

When this silazane polymer was pyrolyzed in a nitrogen atmosphere at temperatures of up to 1400° C. with a heating rate of 5° C./minute, a ceramic material containing a silicon nitride was obtained in a yield of 64% by weight.

It will be understood that the specification and examples are illustrative but not limitative of the present invention and that other embodiments within the spirit and scope of the invention will suggest themselves to those skilled in the art.

I claim:

1. A process for the preparation of an organic silazane polymer comprising
   a) reacting at least one organochlorosilane of the formula

in which
$R^1$ is Cl, H, $C_1$- to $C_4$-alkyl or phenyl, optionally together with at least one organochlorosilane of the formula

or

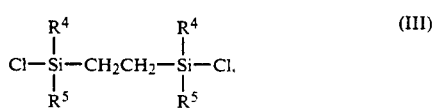

in which
$R^2$, $R^3$, $R^4$ and $R^5$ each, independently is Cl, $C_1$- to $C_4$-alkyl, vinyl or phenyl, with ammonia in an inert solvent at a temperature from about −80° C. to 120° C. to form a product of ammonolysis, and
   b) polymerizing the product of ammonolysis in the presence of a basic catalyst of the formula $$R^6R^7R^8R^9N^+A^- \qquad (IV)$$

in which
$R^6$, $R^7$, $R^8$ and $R^9$ each independently is an organic group having 1 to 24 carbon atoms, and
$A^-$ is a basic anion capable of causing deprotonation, to form an organic silazane polymer.

2. A process according to claim 1, wherein $R^1$ and $R^2$ are methyl, $R^3$ is Cl, methyl or vinyl, and $R^4$ and $R^5$ are Cl or methyl.

3. A process according to claim 1, wherein in step (a) there is employed a mixture of 0 to about 70 mol-% of methyltrichlorosilane, 0 to about 50 mol-% of dimethyldichlorosilane, methylvinyldichlorosilane, 1,2-bis-(dimethylchlorosilyl)ethane or 1,2-bis-(methyldichlorosilyl)ethane, and about 5-100 mol-% of methyldichlorosilane.

4. A process according to claim 1, wherein in step (a) methyldichlorosilane is reacted with ammonia.

5. A process according to claim 1, wherein in step (b) the catalyst is a tetraalkylammonium hydroxide and/or tetraalkylammonium alkoxide.

6. A process according to claim 1, wherein in step (b) the catalyst is at least one of tetramethylammonium hydroxide, tetramethylammonium methoxide, tetraethylammonium hydroxide, tetraethylammonium methoxide, tetrabutylammonium hydroxide, tetrabutylammonium methoxide, benzyltrimethylammonium hydroxide, benzyltrimethylammonium methoxide, a ($C_4$- to $C_{24}$-alkyl)trimethylammonium hydroxide or a ($C_4$- to $C_{24}$-alkyl)trimethylammonium methoxide.

7. An organic silazane polymer according to claim 1, free from alkali metals and alkaline earth metals dissolved therein.

* * * * *